(12) United States Patent
Weh et al.

(10) Patent No.: US 8,128,180 B2
(45) Date of Patent: Mar. 6, 2012

(54) HYDRAULIC BRAKE SYSTEM

(75) Inventors: Andreas Weh, Sulzberg (DE); Matthias Mayr, Rettenberg (DE)

(73) Assignee: Robert Bosch GmbH, Stuttgart (DE)

( * ) Notice: Subject to any disclaimer, the term of this patent is extended or adjusted under 35 U.S.C. 154(b) by 664 days.

(21) Appl. No.: 12/299,389

(22) PCT Filed: Mar. 20, 2007

(86) PCT No.: PCT/EP2007/052647
§ 371 (c)(1),
(2), (4) Date: Nov. 3, 2008

(87) PCT Pub. No.: WO2007/128616
PCT Pub. Date: Nov. 15, 2007

(65) Prior Publication Data
US 2009/0072616 A1    Mar. 19, 2009

(30) Foreign Application Priority Data
May 5, 2006    (DE) .................. 10 2006 020 890

(51) Int. Cl.
*B60T 8/36*    (2006.01)
(52) U.S. Cl. .................... 303/116.2; 303/84.2
(58) Field of Classification Search ............. 303/84.1, 303/84.2, 116.1, 116.2, 119.3; 251/129.15, 251/129.09
See application file for complete search history.

(56) References Cited

U.S. PATENT DOCUMENTS

| 5,658,056 | A | | 8/1997 | Rischen et al. | |
|---|---|---|---|---|---|
| 6,003,958 | A | * | 12/1999 | Volz et al. | 303/116.1 |
| 6,318,814 | B1 | * | 11/2001 | Burgdorf et al. | 303/113.1 |
| 7,144,091 | B2 | * | 12/2006 | Inage et al. | 303/119.3 |
| 2004/0056529 | A1 | | 3/2004 | Otto | |
| 2007/0284938 | A1 | * | 12/2007 | Ziegler | 303/119.3 |

FOREIGN PATENT DOCUMENTS

| DE | 44 31 250 A1 | 3/1996 |
|---|---|---|
| WO | WO 02/053435 A1 | 7/2002 |

* cited by examiner

*Primary Examiner* — Christopher Schwartz
(74) *Attorney, Agent, or Firm* — Ronald E. Greigg

(57) ABSTRACT

The invention relates to a hydraulic braking system having a device for controlling brake slip, drive slip, and/or the driving stability of a vehicle. Among other things, such devices use pumps, valves, and reservoirs to control brake pressure in the wheel brakes in accordance with wheel slip occurring at the particular wheels. These components are in contact with each via a hydraulic circuit. The hydraulic circuit is built into a hydraulic block that has spaces for installing the components and channels for hydraulic contact. The invention makes possible a particularly compact and reduced-weight design of the hydraulic block and at the same time low manufacturing costs. For this purpose an advantageous layout and sealing of channels relative to each other and to the surrounding area is provided.

20 Claims, 3 Drawing Sheets

HYDRAULIC BRAKE SYSTEM

CROSS-REFERENCE TO RELATED APPLICATION

This application is a 35 USC 371 application of PCT/EP 2007/052647 filed on Mar. 20, 2007.

BACKGROUND OF THE INVENTION

1. Field of the Invention

The invention is based on a hydraulic brake system having a device for regulating the wheel slip, traction, and/or stability of a vehicle equipped with this hydraulic brake system.

2. Description of the Prior Art

Such brake systems are also well known in the market by the terms anti-lock brake systems (ABS), traction control (TC), and electronic stability program (ESP). By purposeful regulation of the brake pressure into the various wheel brakes, they prevent slip of the associated wheels of the vehicle during various driving situations and thereby make it possible for the vehicle to remain steerable and capable of being controlled by the driver. Accordingly, such brake systems make a substantial contribution to traffic safety.

The key part of such brake systems is a hydraulic assembly, connected between a master cylinder and the wheel brakes, with a hydraulic block, on which various hydraulic components, such as pumps, valves, and/or reservoirs, for regulating the brake pressure are disposed. A corresponding hydraulic block with a built-on electronic control unit for actuating the valves as needed and with an electric motor for driving the pumps is already known, for instance from German Patent Disclosure DE 44 31 250 A1. For receiving the hydraulic components, this known hydraulic block has installation spaces, which communicate in accordance with a hydraulic connection diagram on which the vehicle brake system is based. This hydraulic connection diagram is implemented mechanically in terms of conduits that pass through the hydraulic block. One possible implementation of a hydraulic connection diagram can be found from FIG. 5, in particular, of the aforementioned reference.

In this implementation of the hydraulic connection diagram in the form of the drilling pattern of the hydraulic block, care must be taken, for the sake of good regulating dynamics of the vehicle brake system, to make do with the lowest possible number of conduits that are as short as possible and that extend as directly as possible. The metal-cutting machining work required for this should, for cost reasons, require only a few chucking operations of the hydraulic block during the machining process. Moreover, there are demands made of the drilling pattern in terms of internal pressure-tightness and the resultant operating noise. In automotive construction, it is demonstrably also of particular importance that the hydraulic block have the least possible weight along with compact external dimensions.

ADVANTAGES AND SUMMARY OF THE INVENTION

A subject according to the invention has the advantage that the hydraulic block used occupies extremely little structural space and can be machined in metal-cutting fashion especially easily. Because of its compactness, the hydraulic block furthermore is low in weight. These advantages are based, among other factors, on a disposition, or course, according to the invention of the conduits in the hydraulic block. The proposed conduit course is made possible by a multi-function closure element, which in addition to its closure function serves the purpose of blocking a conduit communication that is appropriate solely from a production standpoint but is not contemplated in the hydraulic connection diagram. This conduit communication connects the installation spaces of two valves that in the hydraulic connection diagram do not communicate with one another.

Because of their function Because of the function of the two valves inside the hydraulic vehicle brake system, the installation spaces are especially well suited to the interconnection of the two valves according to the invention. The two valves can now be disposed parallel and without a height offset from one another in one row on the hydraulic block. This is one factor that among others determines the low structural volume of the hydraulic block. A pin of cylindrical cross section that is available as a mass-produced product on the market can preferably be used as the closure element, which can be press-fitted for instance in the aforementioned conduit embodied as a bore.

BRIEF DESCRIPTION OF THE DRAWINGS

One exemplary embodiment of the invention is shown in the drawings and described in further detail in the ensuing description in conjunction with the drawings, in which.

DESCRIPTION OF THE EXEMPLARY EMBODIMENT

Description Of The Preferred Embodiment

Figure 1:
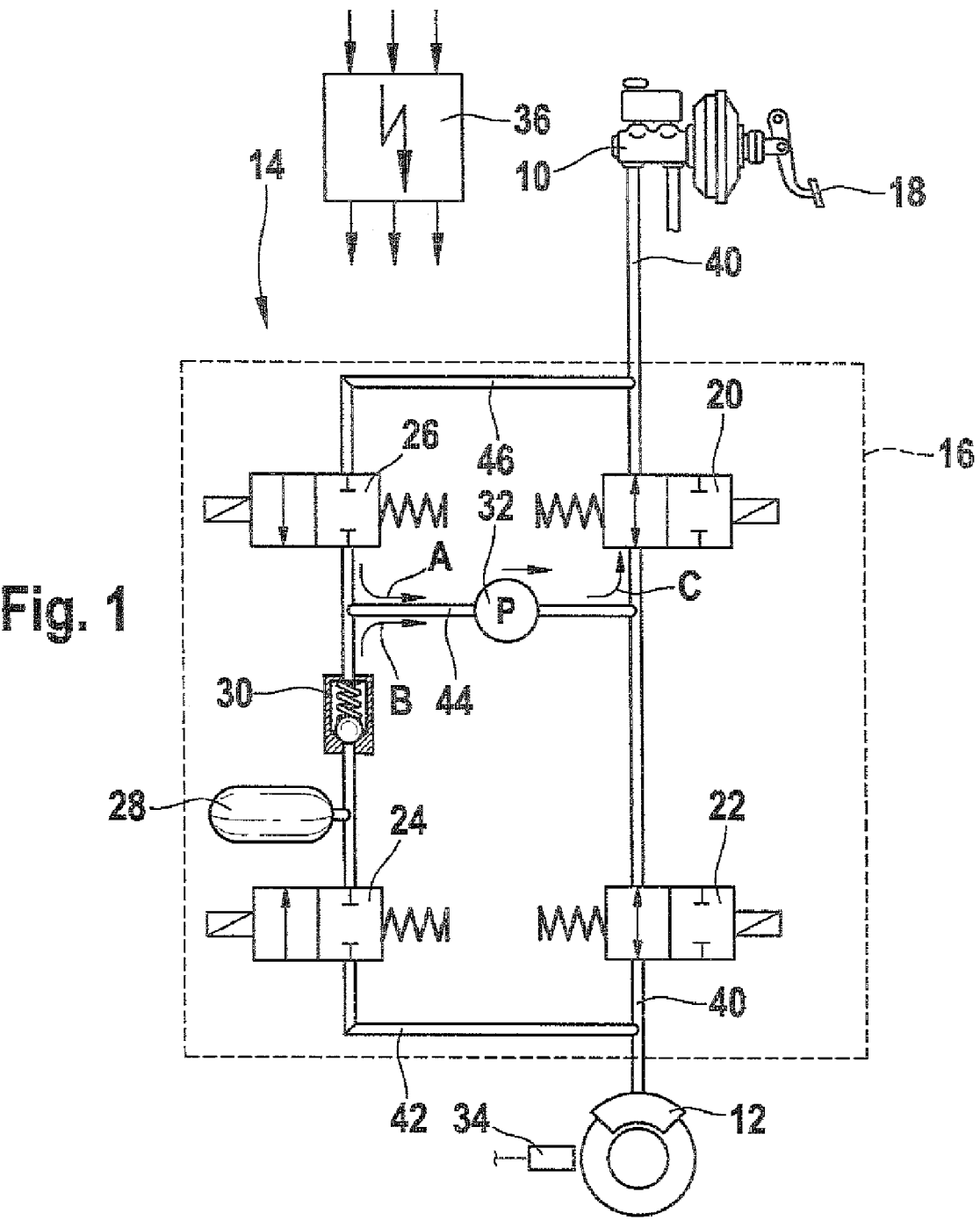
FIG. 1 shows a part of the hydraulic connection diagram of a hydraulic brake system, essential to comprehension of the invention.

As already mentioned, FIG. 1 shows a part of the hydraulic connection diagram of a hydraulic vehicle brake system. This hydraulic connection diagram includes a master cylinder 10 for subjecting a wheel brake 12 to brake pressure, and a device, connected between the master cylinder 10 and the wheel brake 12, for regulating this brake pressure as a function of the wheel slip at an associated wheel of the vehicle. The device 14 for regulating the brake pressure, with its various hydraulic components, has a hydraulic block 16, which is represented symbolically in FIG. 1 by a dashed line. The individual components of the device 14 are a total of four electromagnetically triggerable valves 20 22, 24, and 26, a mechanical check valve 30, a pump 32, and pressure fluid-carrying lines 40, 42, 44, and 46 that connect these components to a hydraulic circuit.

A first line 40 extends from the master cylinder 10 to the wheel brake 12. In it, as a first valve downstream of the master cylinder 10, a so-called reversing valve 20 is disposed. This reversing valve 20 assumes an open position in its basic position and can be switched by electrical triggering over to a blocking position. In the triggered state, the pressure fluid communication from the master cylinder 10 to the wheel brake 12 is interrupted. Farther downstream of the reversing valve 20 is a further, normally open valve, which will hereinafter be called an inlet valve 22. The inlet valve 22 communicates directly with the wheel brake 12 and can be switched over electromagnetically into a blocking position.

Between this inlet valve 22 and the wheel brake 12, a second line 42 (return) branches off, in which a normally closed outlet valve 24 is disposed. This outlet valve 24 controls a connecting line 44 from the wheel brake 12 to the inlet of the pump 32; between the outlet valve 24 and the pump 32, there are also a reservoir 28 and, downstream of the reservoir 28, a check valve 30 opening in the direction of the pump 32. The check valve 30 assures that pressure fluid can flow only from the reservoir 28 to the pump 32, but not back again.

In a line 46 that leads from the master cylinder 10 to the inlet of the pump 32, there is a fourth valve, which is called the high-pressure switching valve 26. This high-pressure switching valve 26 is closed in its basic position, and in the event of its triggering makes it possible for the pump 32 to be supplied as needed with pressure fluid from the master cylinder 10. The compression side of the pump 32 discharges, between the reversing valve 20 and the inlet valve 22, into the first line 40 from the master cylinder 10 to the wheel brake 12.

The function of the hydraulic circuit is known per se and will therefore be described only approximately below:

During normal operation of the brake system, the first line 40 from the master cylinder 10 to the wheel brake 12 is open; the reversing valve 20 and the inlet valve 22 assume their basic position. By actuation of the brake pedal 18 by the driver, brake pressure can built up in the wheel brake 12. If during the braking event, slip is detected at the wheel of the vehicle associated with the wheel brake 12, the triggering of the reversing valve 20 is effected, which thereupon interrupts the communication of the master cylinder 10 with the wheel brake 12. Simultaneously, the pump 32 begins to function; the inlet valve 22 is closed, and the outlet valve 24 opens. As a result, the pump 32 can aspirate pressure fluid from the wheel brake 12 and initiate a lowering of the brake pressure in the wheel brake 12. As soon as the existing slip is eliminated, the brake pressure at the wheel brake 12 can be built up again. To that end, the pump 32 pumps the pressure fluid between the reversing valve 20 and the inlet valve 22 back into the first line 40. The reservoir 28 keeps pressure fluid in readiness and assures the startup of the pump 32.

In the event of a necessary increase in brake pressure, the high-pressure switching valve 26 can be opened electromagnetically, so that the pump 32 can aspirate additional pressure fluid from the master cylinder 10 and pump it to the inlet valve 22. The check valve 30, which allows a flow in only one direction, assures that no pressure fluid from the master cylinder 10 can reach the wheel brake 12 through a possibly still-open outlet valve 24. By alternating opening and closure of the inlet valve 22 and outlet valve 24 in conjunction with the actuation of the pump 32, the brake pressure in the wheel brake 12 can thus be regulated.

If in the event of an acceleration operation of the vehicle, slip occurs at the driven wheels, then by closure of the reversing valve 20, the master cylinder 10 can be decoupled from the wheel brake 12. With a simultaneous startup of the pump 32, pressure fluid can be pumped, independently of the driver, via the opened inlet valve 22 to the wheel brake 12, where a brake pressure can be built up. In other words, the affected driven wheel can be braked in a targeted way, and the loss of traction can thus be eliminated.

In the event that an unstable driving situation threatens, it is also possible, without action on the part of the driver, for one or more wheels of the vehicle to be braked in order to stabilize the vehicle. For detecting incident wheel slip, the individual wheels are equipped with sensors 34 on the vehicle that measure rpm. An evaluation of the signals furnished by these sensors 34 takes place in the electronic control unit 36. This control unit processes the incoming signals into trigger signals for the aforementioned valves 20, 22, 24, and 26.

Figure 2:
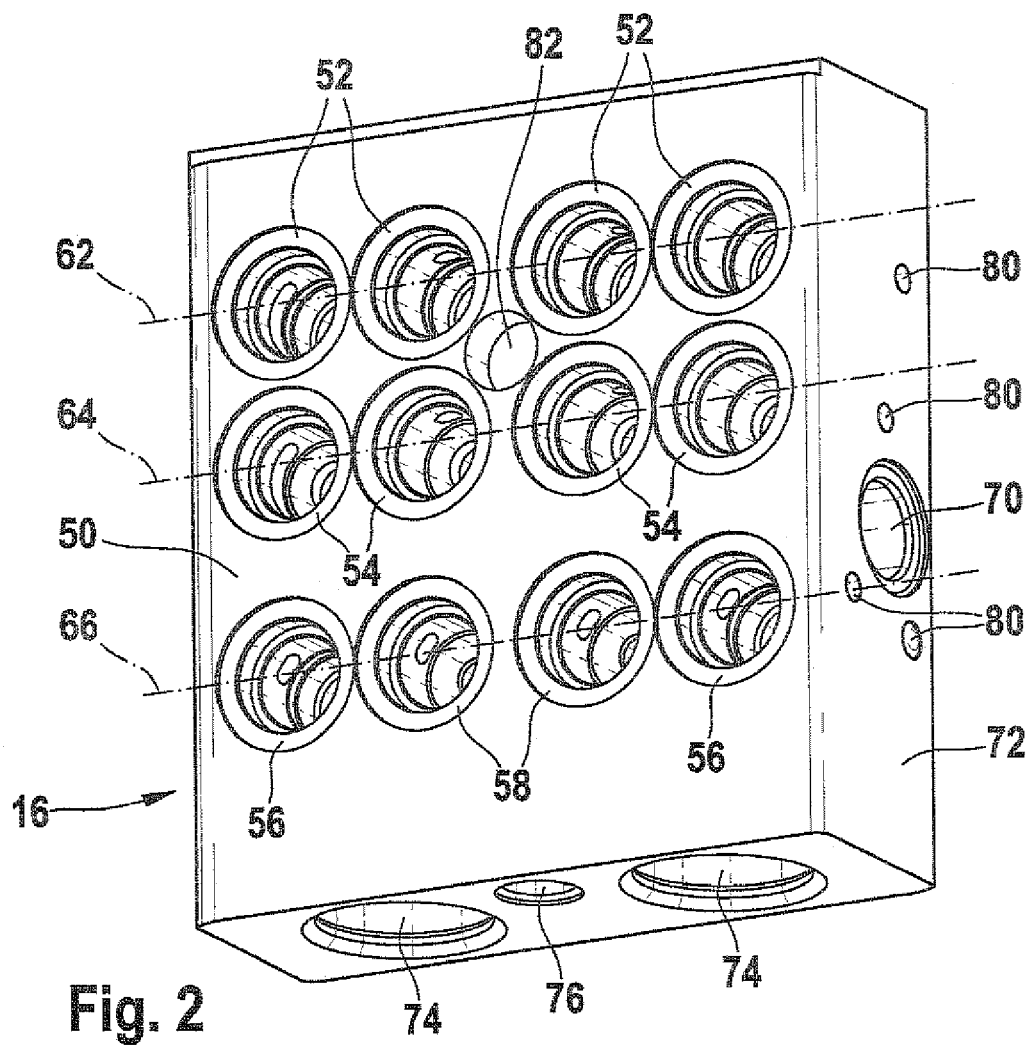
FIG. 2 shows the hydraulic block of one such brake system in a perspective view.

FIG. 2, in a three-dimensional view, shows the hydraulic block 16 in its built-in position. This hydraulic block 16 has a plurality of the hydraulic circuits shown in FIG. 1. This block comprises a block-shaped metal part 50, into which, by metal-cutting machining processes, among other features installation spaces 52, 54, 56, and 58 for the various valves 20, 22, 24, and 26 are embodied. Four at a time of the installation spaces 52, 54, 56, and 58 are disposed parallel and side by side in three rows 62, 64, and 66, which extend at different heights on the front side of the hydraulic block 50. The top row 62 of installation spaces 52 is intended for receiving the outlet valves 24 of the hydraulic circuits; the middle row 64 receives the inlet valves 22 of the hydraulic circuits; and in the bottom row 66, the outer installation spaces 56 serve to receive the reversing valves 20, while the inner installation spaces 58 serve to receive the high-pressure switching valves 26. The bottom row 66 of installation spaces 56, 58 is spaced farther apart from the middle row 64 than this middle row 64 is spaced apart from the top row 62. As a result, space is created in the hydraulic block 50 for providing installation spaces 70 for the pumps 32. These 7 installation spaces 70 extend at a right angle to the installation spaces 52, 54, 56, and 58 of the valves 20, 22, 24, and 26 and begin at the side faces 72 of the hydraulic block 16. FIG. 2 shows only the installation space 70 of a single pump 32; the diametrically opposed installation space of a second pump cannot be seen in this view. Further installation spaces 74 for receiving the reservoirs 28 of the hydraulic circuits extend from the underside 76 vertically upward into the hydraulic block 16.

The installation spaces 52, 54, 56, 58, 70, 74 listed communicate with one another by pressure-fluid-carrying conduits to form the hydraulic circuits. The conduits are made by means of metal-cutting machining into bores 80 in the hydraulic block 16. Four of these pressure fluid-carrying bores 80 begin at the side face 72, visible in FIG. 2, of the hydraulic block 16. In the case of the hydraulic assembly that is ready for use, these bores of the hydraulic block 16 are sealed off from the environment by closure elements. A further bore 82 in the hydraulic block 16 is disposed between the upper two rows 62 and 64 of installation spaces 52, 54. It extends from the front side of the hydraulic block 16 through to the back and serves as a duct for electric lines, which puts an electric motor, which can be secured to the back side facing the other way, into electrical contact with the electronic control unit 36 that can be mounted on the visible front side. Via the electric motor, the drive of a preferably used eccentric element, which can be built into the interior of the hydraulic block 16 from the direction of the back side, is effected. This eccentric element, not visible in FIG. 2, imposes a reciprocating stroke motion on the pumps 32.

Figure 3:
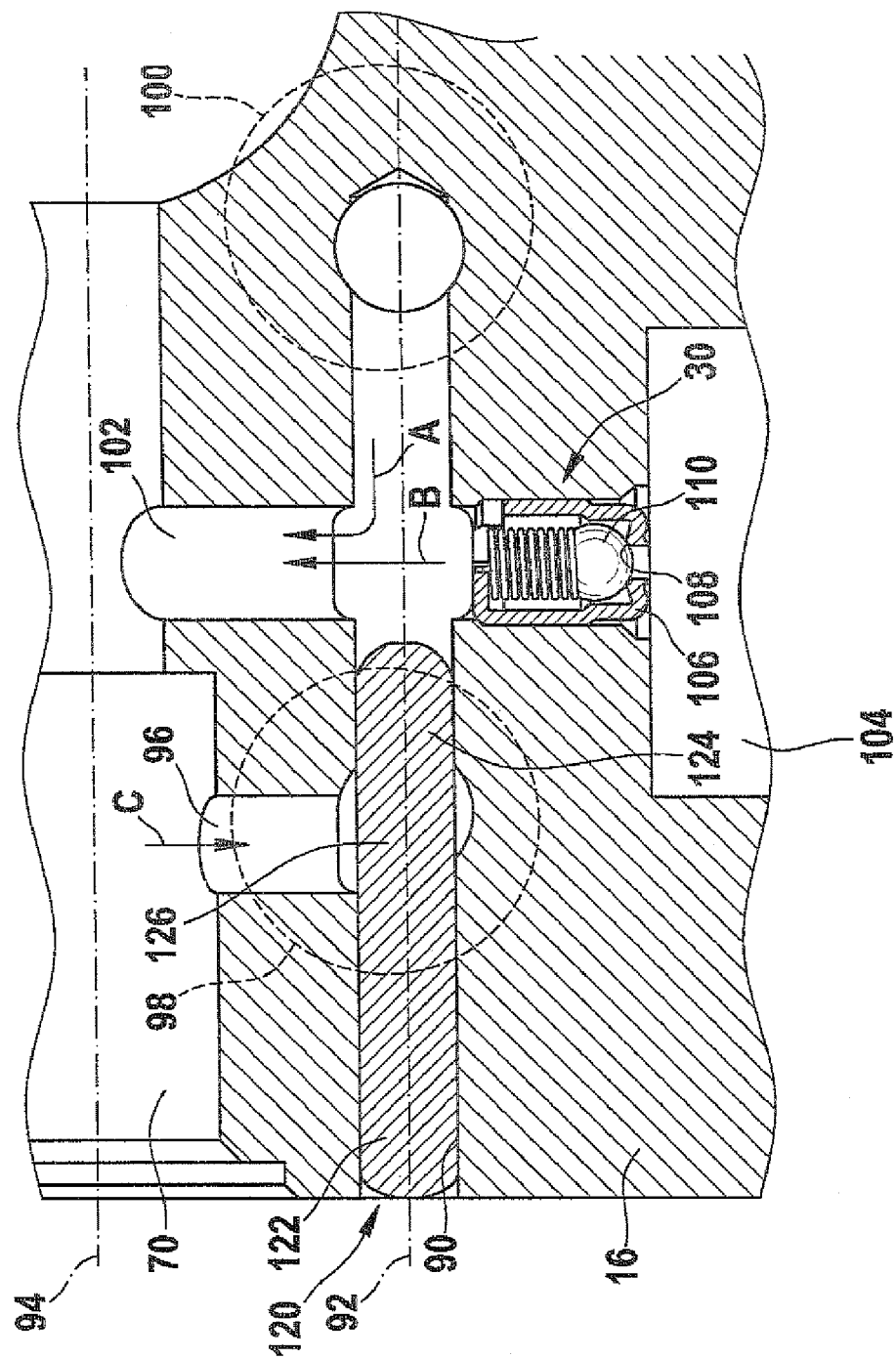
FIG. 3 shows in a longitudinal section through a definitive part of the hydraulic block according to the invention.

FIG. 3 shows a detail of the hydraulic block 16 in longitudinal section. A first conduit 90 can be seen, which is embodied in the form of a blind bore and which begins on an outer side, on the left in FIG. 3, of the hydraulic block 16. This first conduit 90 is disposed below an installation space 70 for a pump 32. Its longitudinal axis 92 extends parallel to the longitudinal axis 94 of this installation space 70. A second conduit 96 extends, with lateral spacing from the left-hand outer side of the hydraulic block 16, at right angles to the longitudinal axis of the installation space 70. This second conduit 96 establishes a communication between the compression side of the pump 32 and the first conduit 90. The first installation space 98 for the valve 20 is located in the region of the discharge point of the second conduit 96 into the first conduit 90. This installation space 98 is indicated by merely a dashed line, since its cross section extends from the back side of the hydraulic block 16. This installation space 98 is intended for receiving the reversing valve 20 and is likewise put into electrical contact with the first conduit 90. A second installation space 100 is located with parallel offset from and at the same height as the first installation space 98, farther inside the hydraulic block 16. This installation space 100 receives the high-pressure switching valve 26 and is likewise connected hydraulically to the first conduit 90. Between the two installation spaces 98 and 100 of the valves 20, 26, a third conduit 102 is shown, extending parallel to the second conduit 96. This third conduit 102 discharges at one end into an installation space 104 for the reservoir 28, and to that end communicates diametrically opposite with an intake-side region of the installation space 70 of the pump 32. Along the way from the installation space 70 of the pump 32 to the installation space 104 of the reservoir 28, the third conduit 102 intersects the first conduit 90. The check valve 30 is located in the bore 102 just upstream of the installation space of the reservoir 28. It enables a flow of pressure fluid only out of the reservoir 28 into the first conduit 90 and blocks the flow in the opposite direction. To that end, the check valve 30 has a valve seat body 106, with a valve seat 108 embodied on it. The valve seat 108 cooperates with a closing body 110, which for this purpose is pressed against the valve seat 108 by a compression spring (not numbered). This compression spring is fastened between the valve seat body 106 and the closing body 110.

A closure element 120, in this case embodied in the form of a cylindrical pin, is press-fitted into the first conduit 90. This cylindrical pin extends from the outer side of the hydraulic block 16 to beyond the discharge point of the second conduit 96 into the first conduit 90 as well as beyond the discharge point of the installation space 98 into the first conduit 90. The closure element 120 has a first, outer sealing section 122 oriented toward the outer side of the hydraulic block 16. This sealing section has the function of closing off the first conduit 90 from the environment. A second, inner sealing section 124 is located diametrically opposite the outer sealing section 122. This inner sealing section blocks off a pressure fluid communication, not required in the hydraulic connection diagram, from the installation space 70 of the pump 32, or from the installation space 98 of the first valve 20, to the installation space of the high-pressure switching valve 26. The second conduit 96, extending from a part of the installation space 70 on the compression side of the pump 32 to the first conduit 90, and the installation space 98 of the first valve 20 are in communication with one another hydraulically. This is attained by means of flow cross sections that are dimensioned to be larger than the cross section of the first conduit 90. The cylindrical pin penetrating the discharge points thus has a center portion 126 that is located between its two sealing sections 122, 124 and is bathed by pressure fluid.

The pressure fluid connections, corresponding to one another, in the hydraulic connection diagram of FIG. 1 and in its mechanical implementation in FIG. 3 are illustrated in the various drawings by means of directional arrows. These directional arrows are identified by capital letters A through C.

It is understood that modifications or additions to the exemplary embodiment described are possible without departing from the described fundamental concept of the invention.

What is claimed is:

1. A hydraulic vehicle brake system having a device for regulating the wheel slip, traction, and/or vehicle stability, comprising
a hydraulic block having installation spaces for hydraulic components, such as pumps, valves, and/or reservoirs, the hydraulic block being in contact with external devices, embodied as a master cylinder and as wheel brake cylinders, the hydraulic block having pressure-fluid-carrying conduits, which hydraulically connect the components with one another in accordance with a hydraulic circuit on which the vehicle brake system is based, the hydraulic block embodied as:
a first conduit connecting a first installation space of a first valve with a second installation space of a second valve and which discharges at an outer face of the hydraulic block;
a second conduit discharging into the first conduit; and
a closure element being inserted into the first conduit, and which has a first sealing section that closes off the first conduit from the outside in pressure-fluid-tight fashion, and which has a second sealing section diametrically opposite the first sealing section, the second sealing section being located on the far side of a discharge point of the second conduit into the first conduit and blocking communication of the first installation space with the second installation space or blocking communication of the second conduit with the second installation space,
wherein the closure element has a center portion, bathed by pressure fluid and located between the first and second sealing sections.

2. The hydraulic brake system as defined by claim 1, wherein the first valve controls a line which leads from the master cylinder connected to the hydraulic block, to a wheel brake connected to the hydraulic block, and wherein the second valve controls a conduit which leads from the master cylinder to an intake side of the pump.

3. The hydraulic brake system as defined by claim 2, wherein the first and second installation spaces of the first and second valves respectively are oriented parallel to one another and are disposed in a single row, at an approximate same height on the hydraulic block.

4. The hydraulic brake system as defined by claim 3, wherein the first and second conduits extend substantially perpendicular to one another.

5. The hydraulic brake system as defined by claim 4, wherein the first conduit is embodied as a blind bore which extends parallel to the longitudinal axis of an installation space for the pump.

6. The hydraulic brake system as defined by claim 2, wherein the first and second conduits extend substantially perpendicular to one another.

7. The hydraulic brake system as defined by claim 6, wherein the first conduit is embodied as a blind bore which extends parallel to the longitudinal axis of an installation space for the pump.

8. The hydraulic brake system as defined by claim 2, further comprising a third conduit between the discharge point of the second conduit into the first conduit and the discharge point of the second installation space of the second valve, the third conduit connecting a reservoir to the installation space of the pump.

9. The hydraulic brake system as defined by claim 1, wherein the first and second installation spaces of the first and second valves respectively are oriented parallel to one another and are disposed in a single row, at an approximate same height on the hydraulic block.

10. The hydraulic brake system as defined by claim 9, wherein the first and second conduits extend substantially perpendicular to one another.

11. The hydraulic brake system as defined by claim 10, wherein the first conduit is embodied as a blind bore which extends parallel to the longitudinal axis of an installation space for the pump.

12. The hydraulic brake system as defined by claim 9, further comprising a third conduit between the discharge point of the second conduit into the first conduit and the discharge point of the second installation space of the second valve, the third conduit connecting a reservoir to the installation space of the pump.

13. The hydraulic brake system as defined by claim 1, wherein the first and second conduits extend substantially perpendicular to one another.

14. The hydraulic brake system as defined by claim 13, wherein the first conduit is embodied as a blind bore which extends parallel to the longitudinal axis of an installation space for the pump.

15. The hydraulic brake system as defined by claim 14, further comprising a third conduit between the discharge point of the second conduit into the first conduit and the discharge point of the second installation space of the second valve, the third conduit connecting a reservoir to the installation space of the pump.

16. The hydraulic brake system as defined by claim 13, further comprising a third conduit between the discharge point of the second conduit into the first conduit and the discharge point of the second installation space of the second valve, the third conduit connecting a reservoir to the installation space of the pump.

17. The hydraulic brake system as defined by claim 1, wherein the closure element is press-fitted into the first conduit.

18. The hydraulic brake system as defined by claim 17, the closure element is a cylindrical pin.

19. The hydraulic brake system as defined by claim 1, further comprising a third conduit between the discharge point of the second conduit into the first conduit and the discharge point of the second installation space of the second valve, the third conduit connecting a reservoir to the installation space of the pump.

20. The hydraulic brake system as defined by claim 1, the closure element is a cylindrical pin.

* * * * *